United States Patent [19]
Jensen

[11] 3,768,760
[45] Oct. 30, 1973

[54] GRAPHITE FIBER COMPOSITE COVERING EMPLOYING MULTI-DIRECTIONAL

[75] Inventor: Leo C. Jensen, Cumberland, Md.

[73] Assignee: Hercules Incorporated, Wilmington, Del.

[22] Filed: Oct. 30, 1970

[21] Appl. No.: 85,626

[52] U.S. Cl. .................................. 244/123, 161/55
[51] Int. Cl. ................................................ B64c 5/00
[58] Field of Search ............................ 244/123, 35; 161/55–58, 156, 170

[56] References Cited
UNITED STATES PATENTS
2,655,459  10/1953  Gordon et al. ................... 244/123 X OTHER PUBLICATIONS
Science Journal, Carbon Fibres by W. T. Gunston, Feb. 1969, Pages 39–49.

Primary Examiner—Milton Buchler
Assistant Examiner—Carl A. Rutledge
Attorney—Michael B. Keehan

[57] ABSTRACT

A covering for a structural component subjected to complicated and non-homogeneous loads in which high stiffness and light weight are necessary is provided. The covering is prepared from a graphite fiber composite in which the strength characteristics of the graphite fiber are efficiently utilized through multi-directional orientation of graphite fibers in the in-plane shear plies of the covering. The fibers in the in-plane shear plies are oriented in at least two angles from a reference axis through the in-plane shear ply, whereby the number of fibers in this ply loaded lenghwise of the filaments is maximized.

3 Claims, 6 Drawing Figures

Patented Oct. 30, 1973

LEO C. JENSEN
INVENTOR

BY Michael B. Keehan

ATTORNEY

LEO C. JENSEN
INVENTOR

GRAPHITE FIBER COMPOSITE COVERING EMPLOYING MULTI-DIRECTIONAL

This invention relates to a graphite fiber composite covering having increased multi-directional strength and stiffness. More particularly, this invention relates to a graphite fiber composite covering for a structural component subjected to complicated, non-homogeneous loads in which the number of fibers, opposing any particular load lengthwise of the filament, is maximized. Still more particularly, this invention relates to a graphite fiber composite covering having particular use in the fabrication of airfoils. In still another aspect, this invention relates to airfoils of light weight prepared from a base structure of the honeycomb type and having a graphite fiber composite covering over the honeycomb base structure wherein some of the individual lamina comprising the plies of the graphite fiber composite covering are characterized by multi-directional orientation of the graphite fibers in the lamina.

Graphite fibers are anisotropic materials and exhibit their greatest strength lengthwise of the fiber. This is most noticeable in aircraft components in which the base structure is of the honeycomb type subjected to complicated, non-homogeneous loads. The principal reason for the marginal advantage of employing graphite fiber components in many applications is that the directional properties of the graphite fiber composite have not been efficiently utilized.

The promising potential of the high strength and stiffness to weight ratios offered by advanced graphite fiber composites is being successfully employed for aircraft applications. For many of these applications, the advantages of the graphite fiber composites are fully realized. For other applications, however, the advantages of employing graphite fiber components are marginal.

Present methods of preparation of graphite fiber composites result in a composite in which the individual filaments in the composite structure are prepared with all the fibers or filaments of each lamina of the composite oriented in one direction. The orientation of direction of graphite fibers is sometimes reversed on every other lamina such that the reversal angle of the fibers measured from a reference axis is equal to but opposite in direction to the angle established in the preceding lamina. Thus, for example, fibers or filaments laid up at an angle of +45° from a reference axis in preparing one lamina are laid at an angle of −45°, with respect to the reference axis, over the first lamina in preparing the second lamina of a ply. The reversal of the angles that the filaments in the lamina make with respect to a reference axis, continues until a composite ply of the desired gauge thickness is obtained. This form of lay-up of graphite fibers in preparing a graphite fiber composite material is generally referred to in the art as a plus or minus (±) lay-up.

An illustrative example of a structure which is subjected to complicated, non-homogeneous loads is an airfoil. Through analysis of the loads imposed on an airfoil of an aircraft employing graphite fiber composites as a covering for the airfoil base structure prepared in the conventional manner using a ± lay-up technique, heretofore described, it was discovered that virtually one-half of the graphite fibers in the composite, designed to provide in-plane shear strength, were contributing only slightly to the flexure strength or stiffness of the airfoil. Approximately one-half of the graphite fibers in the inplane shear plies of this composite covering were being loaded perpendicular to the longitudinal axis of the fibers, or in other words, the fibers were being loaded in their weakest mode.

In accordance with this invention, a graphite fiber composite covering is provided for a structural component subjected to complicated and non-homogeneous loads. This graphite fiber composite covering comprises a multiplicity of plies bonded together forming a covering or skin, said covering being designed to oppose multiple loads. The fibers in each ply are oriented so as to substantially maximize the number of load aligned fibers in the covering opposing the loads to which the covering is subjected. A load aligned fiber is defined herein, to mean a graphite fiber loaded along the longitudinal axis of the fiber or lengthwise of the fiber. The number of load aligned fibers is maximized as a result of preparing in-plane shear plies within the covering from a multiplicity of multi-directional lamina. The graphite fibers in each multi-directional lamina are oriented in at least two angles of opposite sign measured from a reference transverse axis of the lamina, said angles substantially corresponding with the direction of maximum calculable in-plane shear stress which each fiber in the in-plane shear ply is designed to oppose. The in-plane shear laminas are placed in a contiguous relationship in forming the in-plane shear ply of the graphite composite covering, so that the fibers in each lamina of the in-plane shear ply are in a substantially side-by-side and parallel relationship with corresponding filaments of an adjacent in-plane shear lamina.

The graphite composite covering of this invention has principal utility in preparation of airfoils. An airfoil has in combination, a base structure and a covering for said base structure. The covering for the base structure comprises a multiplicity of graphite composite plies designed to withstand applied loads such as chordwise bending, spanwise bending, and in-plane shear. The plies are prepared from graphite fibers bonded together with a resin. The graphite fiber in the plies are oriented so that the graphite fibers in the lamina comprising the plies are loaded so as to maximize the number of load aligned fibers in each ply.

The following drawings more fully illustrate this invention with particular reference to use of the graphite fiber composite covering in an airfoil. In the drawings, like numbers refer to like parts where applicable.

Figure 1:
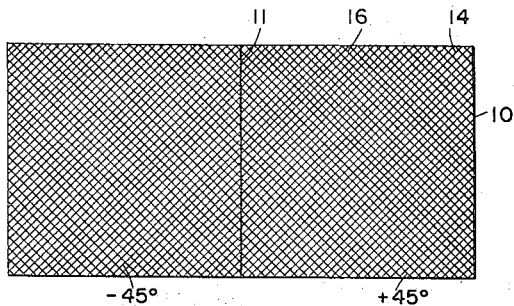
FIG. 1 is a plane view of a ply of graphite fiber composite prepared in a ±45° lay-up in which the filaments in each lamina of the ply are unidirectional.
Figure 2:
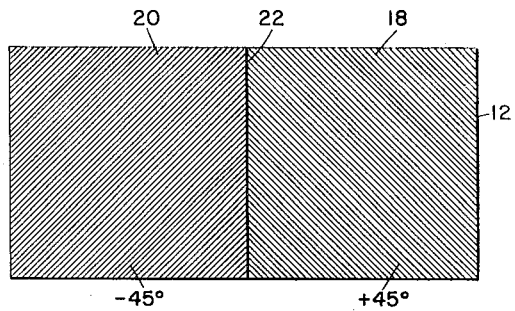
FIG. 2 is a plane view of a graphite fiber composite in which the filaments in each lamina of the ply are multi-directional.

FIGS. 1 and 2 illustrate in a simplified manner the basic difference in a graphite fiber composite material 10 employing unidirectional lamina or ± lay-up and a graphite fiber composite material 12 having multi-directional lamina to prepare a multi-directional ply. The conventional graphite fiber composite material 10 has substantially one-half of the total filaments 14 inclined at an angle of −45° and one-half of the total filaments 16 inclined at an angle of +45° with respect to a reference transverse axis 11 through the ply. The filaments in each lamina of the conventional ply are, however, unidirectional.

The graphite composite lamina illustrated in FIG. 2 is specially designed for the same loads to be imposed on the graphite fiber composite material of FIG. 1. This graphite fiber composite lamina of FIG. 2 can be prepared by cutting two sections 18, 20 of conventionally wound unidirectional graphite fiber cloth and bonding the cloths together such as shown along line 22 representing the central transverse axis of the lamina. The filaments of section 18 are directed at an angle of +45° and the filaments of section 20 are directed at an angle of −45° with respect to the central transverse axis 22. Thus, if a single lamina of the bonded ply is examined, it is seen that each lamina is comprised of a multiplicity of graphite filaments oriented in two directions with respect to the central transverse axis 22 of the lamina. The angles of the filaments in the lamina are always of opposite sign with respect to the reference axis and are on opposite sides of the reference transverse axis.

Figure 3:
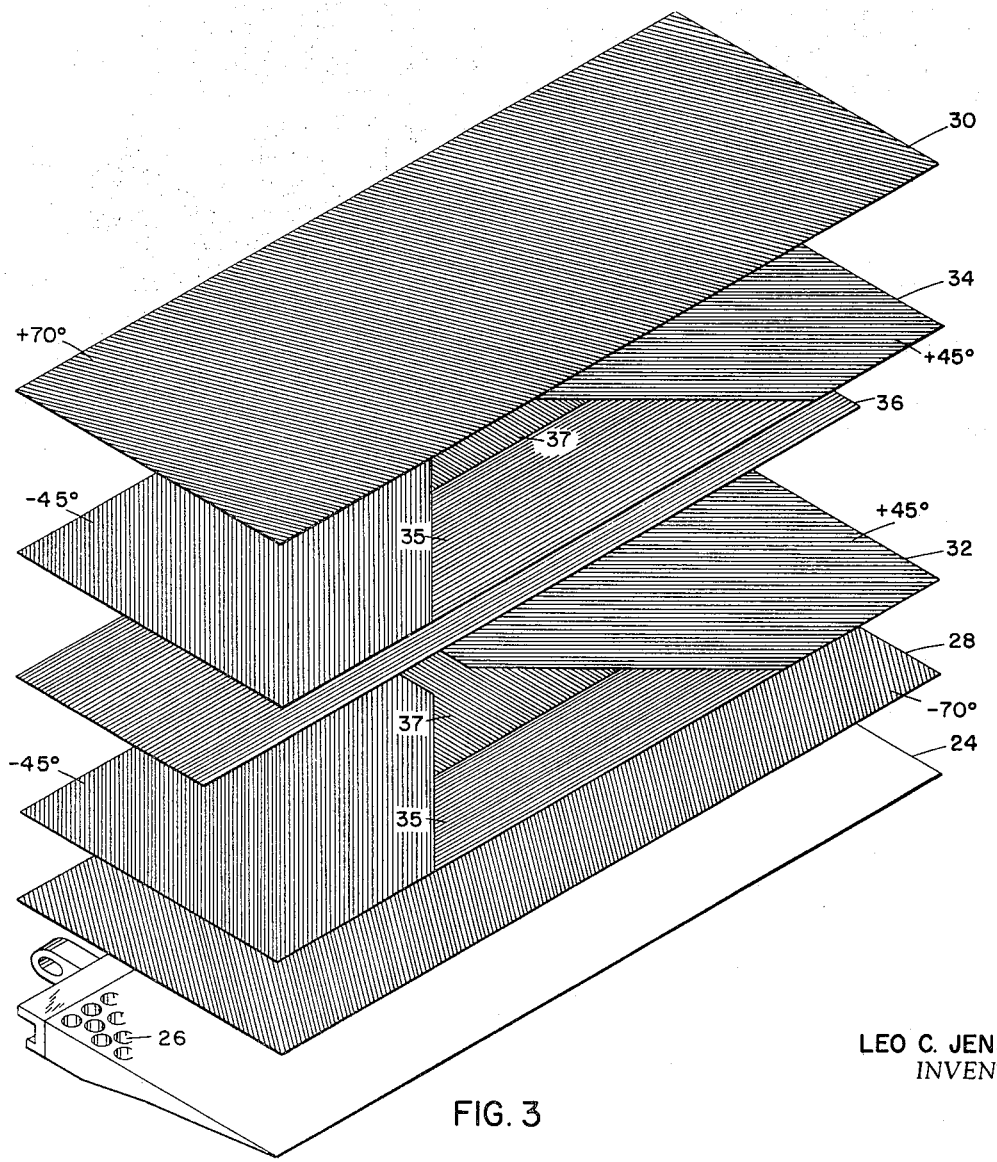
FIG. 3 is a schematic view of an airfoil in which the airfoil base structure is partly broken away and in which the plies which are bonded together to form the covering or skin of the airfoil are illustrated separately above the base structure in order of assembly of the plies. These plies when laid in a contiguous relationship (not shown) and bonded together form the upper skin of the airfoil.

FIG. 3 illustrates an airfoil of this invention which is a spoiler. An airfoil base structure 24 of the honeycomb type design 26 is illustrated. This base structure 24 is covered with a top skin comprising five plies. There are two plies 28 and 30 designed to oppose chordwise bending. There are two multi-directional plies 32 and 34 of this invention which are designed to withstand in-plane shear and there is a central ply 36 designed to withstand spanwise bending. The two multi-directional plies 32 and 34 are prepared having the graphite filaments of each lamina comprising the plies oriented in four directions. The plies are prepared from lamina in which the fibers to the port (left) side of the spoiler are principally oriented at +45° and the fibers at the starboard (right) side of the spoiler are oriented at −45° to oppose in-plane shear stresses. Trailing edge stiffness is provided by filaments 35 at a 0° orientation and filaments 37 provide additional chordwise strength in the yoke region of the airfoil at 90° orientation said orientation angles being measured from the longitudinal axis of the spoiler.

Figure 4:
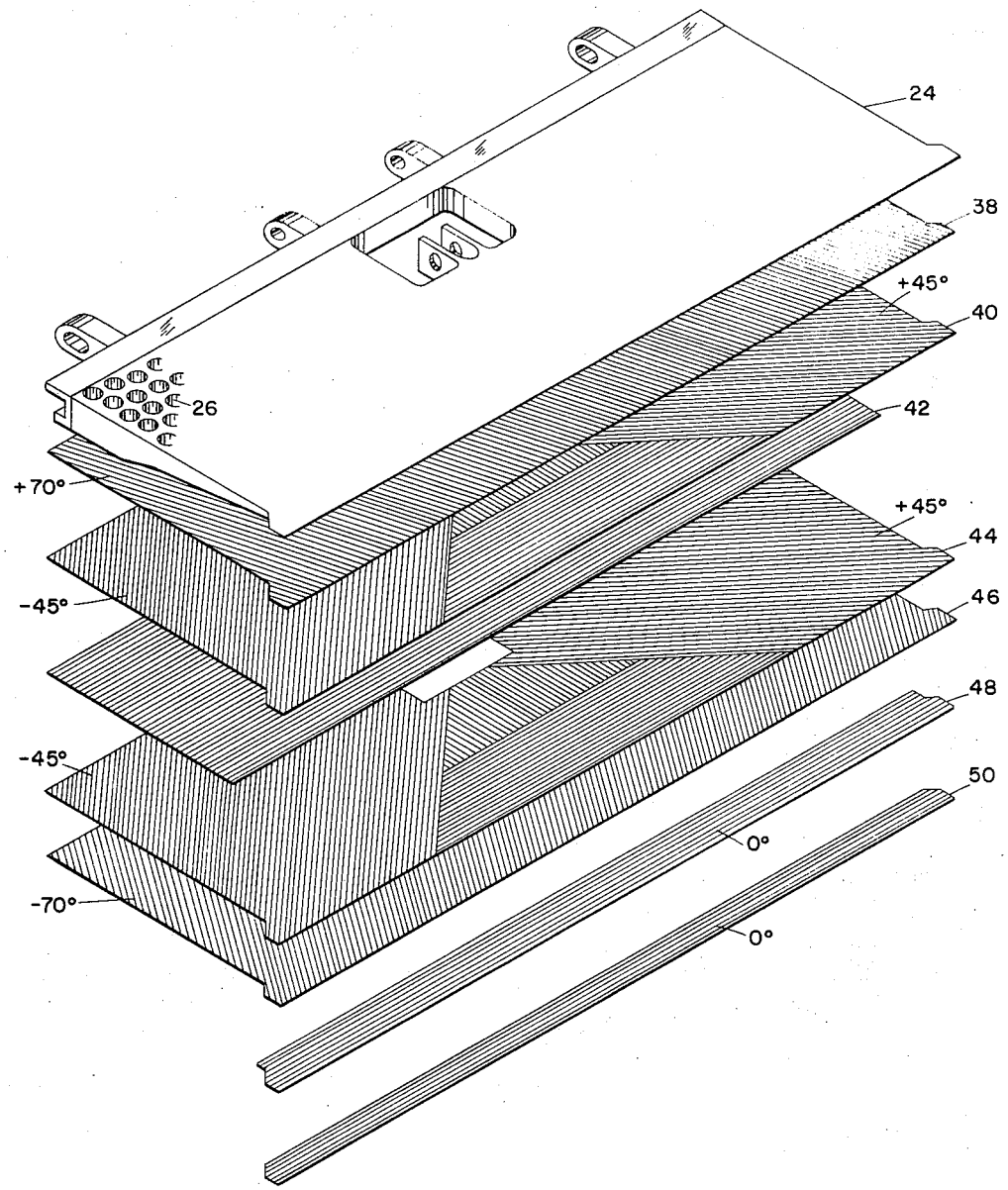
FIG. 4 is a view similar to the view of FIG. 3 illustrating the graphite fiber plies below the base structure, in order of assembly of the plies, comprising the bottom skin of the airfoil.

FIG. 4 illustrates the bottom skin for airfoil base structure 24. The bottom skin of the airfoil comprises five plies. Plies 38 and 46 oppose chordwise bending, multi-directional plies 40 and 44 oppose in-plane shear and ply 42 opposes spanwise bending. Trailing edge doublers 48 and 50, are prepared from graphite fiber composites, and are added to the bottom spoiler skin to enhance stiffness and flutter characteristics of the spoiler. The fibers in the trailing edge doublers are oriented parallel to a longitudinal axis of the spoiler.

A spoiler for an aircraft is prepared in accordance with this invention from a graphite fiber composite. The graphite fiber composites are prepared in the form of sheets or plies which are comprised of multiple layers of graphite fiber lamina. The plies have a thickness of approximately 0.0075 inches, a density of about 0.055 lbs./in.$^3$. The graphite fibers in the composite are bonded together with a B-staged epoxy resin. These sheets of resin bonded fibers are often referred to as prepreg. Properties of the graphite fiber composite employed in preparation of the spoiler are set forth in Table I below.

Composite Properties at 77°F.

0° Tensile Strength, psi  104,400
0° Tensile Modulus, psi × $10^6$  24.0
90° Tensile Strength, psi  6,800
90° Tensile Modulus, psi × $10^6$  1.1
0° Flexure Strength, psi  112,400

Using standard strength of materials calculation methods, the stresses in the spanwise and chordwise directions to which the spoiler skins will be subjected are calculated. In-plane shear stress is determined using the "Three Stringer Method" of E. F. Bruhn, reported in "Analysis and Design of Flight Vehicle Structures", Tri-State Offset Company, Cincinnati, Ohio, (1965). Examination of the stresses in the spoiler using these methods provides the location, magnitude and direction of the forces to be withstood by the spoiler skin. As a result of these calculations a basic ply lay-up of +70°, +45°, 0°, −45°, −70° is determined for the spoiler from design allowable curves calculable, for example, from standard laminate plate and maximum strain failure theory. It is understood that the foregoing procedures for determining stresses in an airfoil are not part of this invention and are well known in the art. It is further understood that other calculation methods for calculating in-plane shear in airfoils can be employed. It is realized that slightly differing magnitudes and direction of forces may be approximated employing these various calculation procedures.

Following the design procedures heretofore described for preparing an airfoil, and following prior art methods of layup of composite materials to form the airfoil skin, the plies of the skin would be assembled as follows. In accordance with the results of the calculations, briefly described, for loads to be imposed on a spoiler, the angles for laying the filaments in the spoiler are as follows: the top ply consists of a +70° ply, the second ply (in-plane shear ply) consists of a +45° ply, the third ply consists of a 0° ply, the fourth ply (in-plane shear ply) consists of a second −45° ply and the bottom ply consists of a −70° ply.

In accordance with applicant's invention, and contrary to the prior art procedure, the plies designed to oppose in-plane shear stress are prepared as multi-directional plies as illustrated in FIGS. 3 and 4. By "splitting" the lamina in the ply designed to oppose in-plane shear as shown in FIG. 2, the number of load aligned graphite fibers in the graphite fiber composite covering is substantially maximized to provide maximum strength for the number of fibers employed.

In preparing a spoiler skin, the upper and lower plies of the graphite fiber composite are laid up on caul plates conforming to the spoiler configuration. The caul plates are then placed in an autoclave and the skins are cured at 35 psig at 180°F. for ½ hour, at 280°F. for ½ hour and at 350°F for 1 hour. The individual plies of the graphite fiber skins are bonded together during the curing operation and the cured spoiler skins top and bottom are removed from the autoclave and cooled. A curable adhesive resin is applied to the spoiler skins and the spoiler skins are laid over a base structure and inserted into a vacuum bag. Epoxy resins are suitable adhesives. A preferred adhesive material is available commercially as FM-123 resin, which is an epoxy resin adhesive system sold by Bloomingdale Rubber Co. A vacuum is drawn on the total assembly. The vacuum maintains the skins in pressure contact with the honeycomb spars and ribs of the base structure until bonding of the skins to the spars and ribs is complete. The total structure comprising the base structure and skins is then placed in an autoclave and cured at a pressure of 35 psig and at a temperature of 250°F. for 45 minutes.

Figure 5:
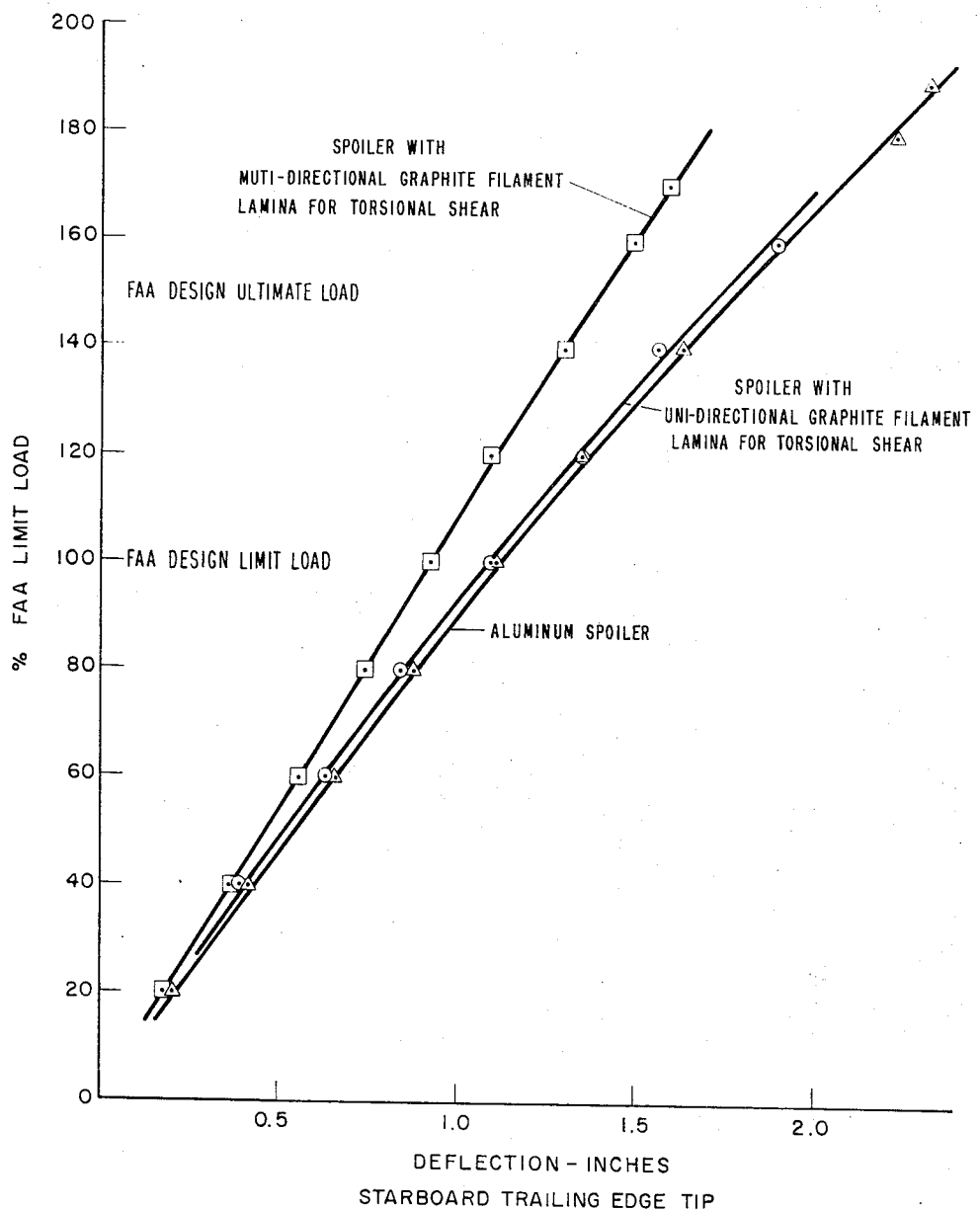
FIGS. 5 and 6 are graphs illustrating the improved strength characteristics of an airfoil of this invention employing multi-directional filament orientation in the plies.
Figure 6:
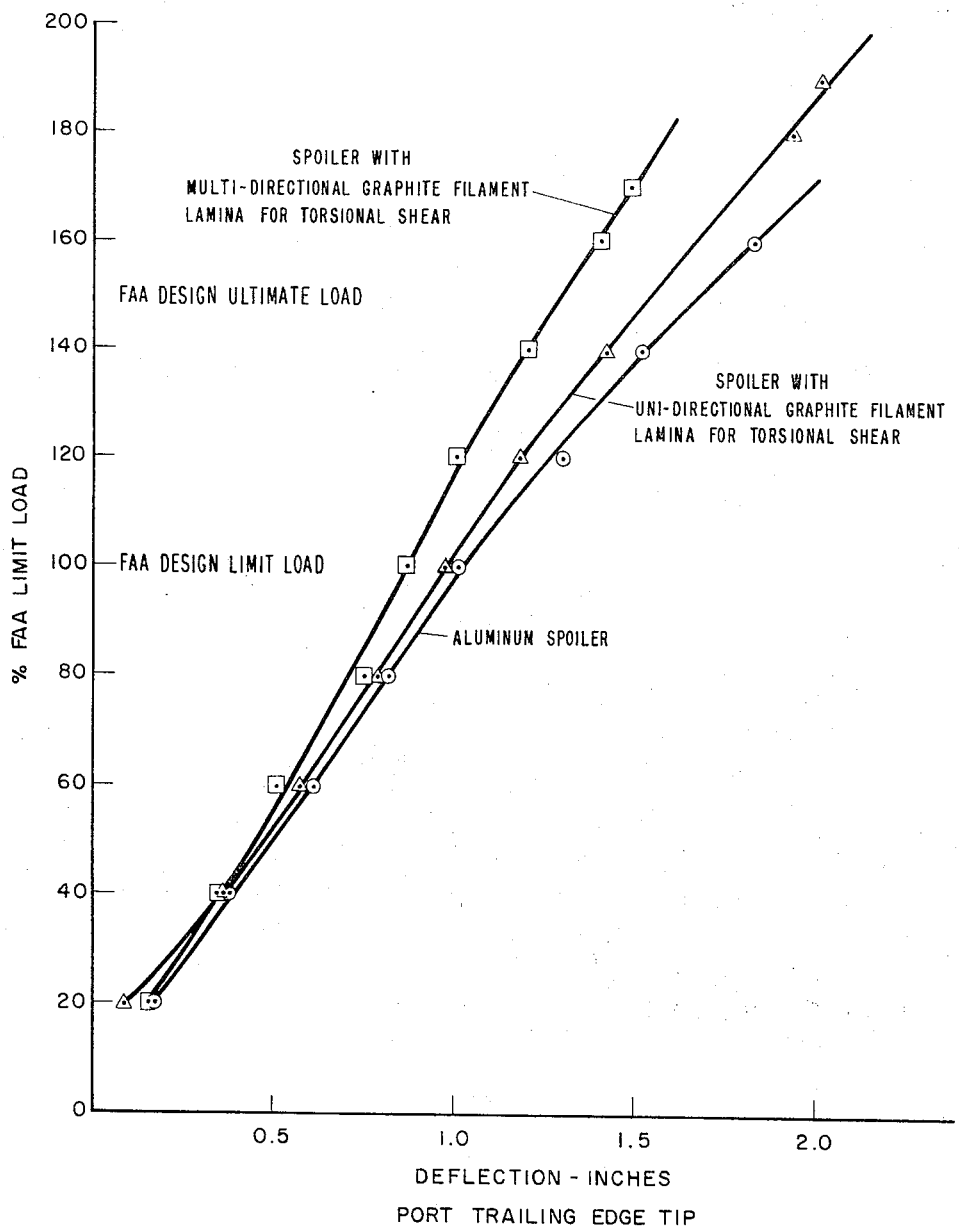

A spoiler of this invention having a graphite fiber covering as described in FIGS. 3 and 4 is subjected to static testing following FAA test procedures. The spoiler is loaded to destruction and fails at 169 percent of FAA Design Limit Load. The load deflection curves for this spoiler are presented in FIGS. 5 and 6 with deflections measured at the starboard trailing edge tip (FIG. 5) and the port trailing edge tip (FIG. 6) of the spoiler. Comparision data is obtained from testing an aluminum spoiler and a second graphite composite spoiler in which both the graphite fiber composite employed in preparing the spoiler skins and the spoiler base structure meet the same specifications as that of the spoiler of this invention. The second graphite fiber spoiler has substantially the same quantities of graphite fiber in the spoiler skin. The principal difference in these two spoilers is that a conventional unidirectional lay-up is used in preparing the plies designed to oppose in-plane shear in the second graphite fiber spoiler. The plies in the top skin of the second graphite composite spoiler have unidirectional orientation of +75°, −45°, 0°, +45°, −75° and the plies in the bottom skin have unidirectional orientation of −80°, +45°, 0°, −45°, +75°. The spoiler prepared employing multi-directional plies in accordance with this invention exhibits about 20 percent less deflection at FAA design ultimate load than either the aluminum spoiler or the second graphite composite spoiler and the graphite fiber skins weigh about 24 percent less than comparable aluminum skins.

The improved strength of airfoils of this invention is achieved by orienting the filaments in the airfoil so that the number of filaments loaded lengthwise of the filament (load aligned filaments) is substantially increased as compared to the number of filaments subjected to lengthwise loading employing graphite fiber plies prepared from ± lay-up methods. By orienting the filaments of a spoiler, for example, in at least two angles from the central transverse axis of the ply designed to oppose in-plane shear and generally at an angle of about +45° and −45° from this central transverse axis, optimum use of the strength characteristics of the graphite fiber composite is realized.

The foregoing invention has been particularly disclosed for use in preparation of a spoiler. It is clear that the graphite fiber composite covering of this invention can be readily employed in other airfoils such as wings, flaps, ailerons, rudders, vertical stabilizers, horizontal stabilizers, helicopter blades, as well as in other structural components requiring high stiffness and light weight. The graphite fiber composite covering of this invention has been described in preparing an airfoil employing five plies of graphite fiber composite. It is understood that the number and thickness of the plies can be varied depending upon the nature of the loads for which the airfoil is being designed.

The resins which can be employed in manufacture of the graphite fiber composite coverings of this invention are curable thermosetting resins such as epoxy polymers and thermoplastic resins. Curable epoxy resins are preferred. These resins can be applied to the graphite fibers by any suitable method such as spraying or impregnation during winding. Solvents for the resins are often employed depending on the properties of the resin to insure thorough wetting of the fibers with the resin. These resins are partially cured or B-staged to solidify the resin and to provide a graphite fiber composite ply which is self-supporting. Partially cured graphite fiber composite plies such as are employed in preparing a spoiler covering can be readily bonded and stored prior to assembly of the plies and final molding as described herein.

Exemplary resins which can be employed include epoxy novolaks, polyimides, and epoxies of the two well known types, viz., the bis-phenol epichlorohydrin and the bis (epoxy-cyclopentyl) ether types. Solvents which can be employed with the resins to aid in wetting of the graphite fibers include methyl ethyl ketone, acetone, ethanol, toluene, and mixtures thereof.

What I claim and desire to protect by Letters Patent is:

1. An airfoil having in combination an airfoil base structure and a graphite fiber composite covering for said base structure, said graphite fiber composite covering comprising a multiplicity of graphite fiber composite plies in which at least one ply is designed to oppose in-plane shear stress, said ply opposing in-plane shear stress being prepared from a multiplicity of graphite fiber lamina bonded together wherein each lamina has multi-directional fiber orientation in which the graphite fibers in each lamina are oriented in at least two angles of opposite sign measured from a reference transverse axis of the lamina, said angles substantially corresponding in direction with the direction of maximum calculable in-plane shear stress for the ply measured from said reference axis, said lamina being bonded together forming an in-plane shear ply, said lamina being placed in a contiguous relationship in forming the in-plane shear ply so that the fibers in each lamina in the ply are in a substantially side-by-side and parallel relationship with the fibers in an adjacent lamina of the in-plane shear ply.

2. The airfoil of claim 1 in which the reference transverse axis of each lamina comprising the in-plane shear ply is the central transverse axis of each lamina.

3. A spoiler having in combination an airfoil base structure and a graphite fiber composite covering for said base structure, said graphite fiber composite covering comprising a multiplicity of graphite fiber composite plies in which at least one ply is designed to oppose in-plane shear stress, said ply opposing in-plane shear stress being prepared from a multiplicity of graphite fiber lamina bonded together wherein each lamina has multi-directional fiber orientation in which the graphite fibers in each lamina are oriented in at least two angles of opposite sign measured from a reference transverse axis of the lamina, said angles substantially corresponding in direction with the direction of maximum calculable in-plane shear stress for the ply measured from said reference axis, said lamina being bonded together forming an in-plane shear ply, said lamina being placed in a contiguous relationship in forming the in-plane shear ply so that the fibers in each lamina in the ply are in a substantially side-by-side and parallel relationship with the fibers in an adjacent lamina of the in-plane shear ply.

* * * * *

PO-1050
(5/69)

UNITED STATES PATENT OFFICE
CERTIFICATE OF CORRECTION

Patent No. 3,768,760    Dated October 30, 1973

Inventor(s) Leo C. Jensen (Case 1)

It is certified that error appears in the above-identified patent and that said Letters Patent are hereby corrected as shown below:

The formal title on the cover page and also in Column 1, line 2 should read -- GRAPHITE FIBER COMPOSITE COVERING EMPLOYING MULTI-DIRECTIONAL FIBER ORIENTATION --

Signed and sealed this 12th day of March 1974.

(SEAL)
Attest:

EDWARD M. FLETCHER, JR.
Attesting Officer

C. MARSHALL DANN
Commissioner of Patents